UNITED STATES PATENT OFFICE

2,227,977

AZO COMPOUNDS AND MATERIAL COLORED THEREWITH

James G. McNally and Joseph B. Dickey, Rochester, N. Y., assignors to Eastman Kodak Company, Rochester, N. Y., a corporation of New Jersey No Drawing. Application August 25, 1939, Serial No. 291,935

9 Claims. (Cl. 260—152)

The present invention relates to azo compounds and to fibrous organic derivatives of cellulose colored therewith. More particularly it relates to azo compounds having the general formula:

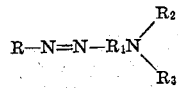

wherein R and $R_1$ each represent a member selected from the group consisting of a benzene nucleus, and a naphthalene nucleus, $R_2$ represents a member selected from the group consisting of hydrogen, an alkyl group, a hydroxyalkyl group, an alkoxyalkyl group, a sulfatoalkyl group, an acetoxyalkyl group, a cyclohexyl group, a phenyl group, and the group $R_3$, and $R_3$ represents an aliphatic chain of three or more carbon atoms, wherein two adjacent carbon atoms form part of a five membered cyclic acetal, and wherein the said adjacent carbon atoms are joined to the nitrogen atom through an alkylene group.

While our invention is primarily concerned with the monoazo compounds, it should be noted that polyazo compounds are likewise included within the scope of the invention. R in the above formula, for example, may be an aromatic component containing an azo bond such as an azobenzene radical.

It is an object, therefore, of our invention to prepare the class of azo compounds described in the preceding and to color organic derivatives of cellulose, but particularly cellulose acetate, in the form of fibers, threads, yarns and fabric materials therewith.

The azo compounds of our invention may be prepared by coupling the diazo salts of various suitable arylamines with coupling compounds containing at least one cyclic acetal group, which latter may be represented by the following general formula:

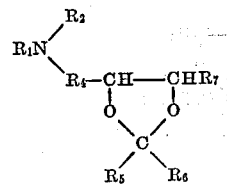

wherein $R_1$ and $R_2$ have the meanings previously designated, $R_4$ represents an alkylene group of one or more carbon atoms, $R_5$ represents a hydrogen atom, and an alkyl group, $R_6$ represents a member selected from the group consisting of hydrogen, an alkyl group, a hydroxyalkyl group, an alkoxyalkyl group, a sulfoalkyl group, and a tetrahydrofurfuryl group, and $R_7$ represents a member selected from the group consisting of hydrogen, an alkyl group, a hydroxyalkyl group, an alkoxyalkyl group, an acetoxyalkyl group, and a cyclic acetal group. Another process for preparing the azo compounds of our invention consists of coupling various glycerylaniline or glycerylnaphthylamine compounds with the specified diazo salt, and then condensing the resulting azo product with an aliphatic aldehyde or ketone in the presence of a condensation catalyst.

The following examples illustrate the preparation of the azo compounds of the invention.

Example 1

One mole of o-chloroaniline is dissolved in 1500 cc. of water containing 250 cc. of hydrochloric acid, ice added, and the mixture diazotized with 69 grams of sodium nitrite. One mole of ethyl-$\beta,\gamma$-ethylidene dioxolane propylaminobenzene is dissolved in ice and water containing 110 cc. of hydrochloric acid and the diazo solution added with stirring. The coupling reaction is completed by neutralizing with sodium acetate, after which the dye is filtered out, washed and dried. Cellulose acetate is colored yellow shades from an aqeous suspension of the dye.

The azo compound obtained has the formula:

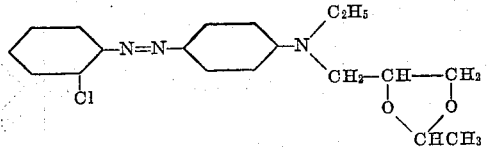

Example 2

One mole of p-nitro-o-chloroaniline is diazotized and coupled with 1 mole of 2-methoxy-5-methyl-$\beta,\gamma$-ethylidine dioxolane propylaminobenzene following the procedure of Example 1. Cellulose acetate is colored deep rubine shades from an aqueous suspension of the dye.

The azo compound has the formula:

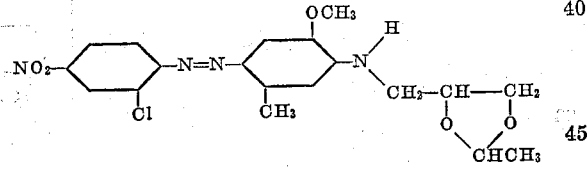

Example 3

One mole of p-nitro-o-bromoaniline is diazotized and coupled with one mole of di-$\beta,\gamma$-formylidine dioxolane propylaniline following the procedure of Example 1. Cellulose acetate is colored rubine shades from an aqueous suspension of the dye.

The azo compound has the formula:

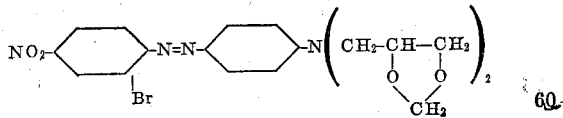

Example 4

One mole of p-nitro-o-methylsulfone aniline is diazotized and coupled with one mole of 5-hydroxy-1-β,γ-hydroxyethylidene dioxolane propylamino naphthalene following the procedure of Example 1. Cellulose acetate is colored blue shades from an aqueous suspension of the dye.

The azo compound obtained has the formula:

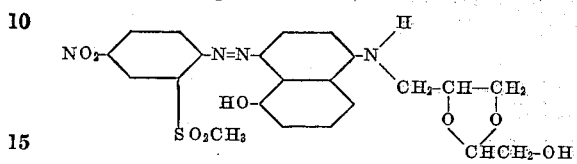

Example 5

(A) One mole of 2,4-dinitro-6-chloroaniline is dissolved in 2200 ccs. of hot acetic acid and rapidly cooled to room temperature.

(B) 76 grams of sodium nitrite are dissolved in 500 ccs. of sulphuric acid by heating the mixture to 70° C., and then cooling to 15-20° C.

Solution A is added with stirring to B over a period of 30 minutes, meanwhile maintaining a temperature of 15-20° C., and the mixture then stirred for an additional hour at room temperature. The coupling reaction is accomplished by adding the above prepared diazo solution to one mole of 1-β-hydroxyethyl-β,γ-formylidene propylamino naphthalene dissolved in water containing ice and acetic acid. Concurrently with the addition of the diazo solution there is added a solution of sodium acetate at such a rate that the reaction mixture is practically neutral to Congo Red indicator. When the coupling reaction is complete, the dye is filtered out, washed and dried. Cellulose acetate is colored blue shades from an aqueous suspension of the dye.

The azo compound obtained has the formula:

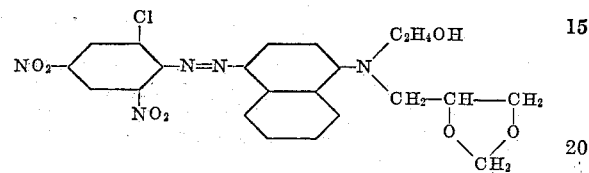

The scope of the invention will be more fully apparent by reference to the following table, wherein are shown various suitable diazotization and coupling components, the dyes resulting therefrom coloring cellulose acetate fibers the shades of color designated.

Table

| Diazo component | Coupling component | Shade on cellulose acetate |
|---|---|---|
| Methyl anthranilate | (structure with C₃H₇, CH₂—CH—CH₂, O, O, CHCH₃) | Orange-yellow. |
| p-Aminoacetophenone | (structure with H, CH₃, CH₂—CH—CH₂, O, O, CH₂) | Orange. |
| p-Nitroaniline | (structure with H, CH₃, CH₂—CH—CH₂, O, O, CHCH₂OCH₃) | Rubine. |
| p-Nitro-o-bromoaniline | (structure with OCH₃, H, OCH₃, CH₂—CH—CH₂, O, O, CHCH₂OH) | Violet. |
| p-Nitro-o-methylaniline | (structure with C₂H₄SO₃Na, CH₂—CH—CH₂, O, O, CH—phenyl) | Orange-red. |
| p-Nitro-o-methoxyaniline | (structure with C₂H₄SO₄NH₄, Cl, CH₂—CH—CH—CH—CH₂, O, O, O, O, CH₂, CHCH₃) | Orange. |

| Diazo component | Coupling component | Shade on cellulose acetate |
|---|---|---|
| 2,4-dinitroaniline | [structure with OCH₃, NHCOCH₃, N(CH₂-CH-CH₂-O-CH₂-O)₂] | Blue. |
| p-Aminoazobenzene | [structure with OCH₃, Cl, N(C₂H₄OCOCH₃)(CH₂-CH-CH-CH₂OH with dioxolane rings)] | Orange-red. |

Besides the diazotization components disclosed in the preceding examples and table, there may also be used for obtaining valuable dyes other primary organic amines including o-bromoaniline, o-fluoroaniline, 2,4-dichloroaniline, 2,5-dichloroaniline, 2-hydroxy-4-nitroaniline, 2,4-dinitro-6-fluoroaniline, 2,4-dinitro-6-bromoaniline, 2,4-dinitro-6-cyanoaniline, 2,4,6-trinitroaniline, 2,4-dinitro-5-chloroaniline, 2,4-dinitro-3,5-dichloroaniline, 2,4-dinitro-3,6-dichloroaniline, 2,4-dinitro-3,6-dibromoaniline, 5-nitro-2-aminophenyl-methylsulfone, 2,4-dinitro-α-naphthylamine, 5-hydroxy-α-naphthylamine, 4-nitro-α-naphthylamine, 1-amino-5-methoxybenzothiazole, o-dianisidine, m-dianisidine and the like compounds. In place of the coupling components disclosed in the preceding examples and table, there may be substituted the following group of compounds.

[Series of chemical structures of coupling components shown]

and

[Final chemical structure shown]

The azo compounds of our invention will ordinarily be applied to organic derivatives of cellulose, particularly fibrous cellulose acetate, in the form of an aqueous suspension obtainable by grinding the dye compound to a paste with a dispersing agent such as soap, a sulfonated oil, or a higher fatty acid glyceryl sulfate, and then dispersing the resulting paste in water. The material to be colored is immersed in the dispersion starting with a bath temperature of 45-55° C., and then gradually increasing the temperature to 80-85° C., at which point it is maintained for several hours. The exhaustion of the dye bath may be facilitated by the addition of sodium chloride during the dyeing operation. When the material has been dyed to the desired degree, it is removed from the bath, washed with soap, rinsed and dried. Where the particular azo compound of our invention is water-soluble, the dye may be applied directly from an aqueous solution without the necessity of employing a dispersing or solubilizing agent. For a more detailed description as to how the water-soluble azo dyes of our invention may be employed, reference may be had to McNally and Dickey, U. S. Patent No. 2,107,898, issued February 8, 1938.

Typical organic derivatives include the hydrolyzed as well as the unhydrolyzed cellulose organic acid esters such as cellulose acetate, cellulose formate, cellulose propionate, or cellulose butyrate, and the hydrolyzed as well as the unhydrolyzed mixed organic acid esters such as cellulose acetate-propionate, cellulose acetate-butyrate, and the cellulose ethers such as methyl cellulose, ethyl cellulose, and benzyl cellulose. While our invention is illustrated more particularly in connection with the coloration of cellulose acetate, a material to which the invention is especially adapted, it will be understood that the invention applies likewise to the coloration of other organic derivatives of cellulose such as those just mentioned.

We claim:
1. The azo compounds having the general formula:

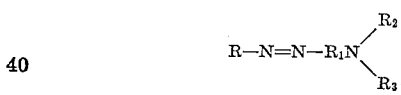

wherein R and $R_1$ each represent a member selected from the group consisting of a benzene nucleus, and a naphthalene nucleus, $R_2$ represents a member selected from the group consisting of hydrogen, an alkyl group, a hydroxyalkyl group, an alkoxyalkyl group, a sulfoalkyl group, a sulfatoalkyl group, an acetoxyalkyl group, a cyclohexyl group, a phenyl group, and the group $R_3$, and $R_3$ represents an aliphatic chain of three or more carbon atoms, wherein two adjacent carbon atoms form part of a five membered cyclic acetal, and wherein the said adjacent carbon atoms are joined to the nitrogen atom through an alkylene group.

2. The azo compounds having the general formula:

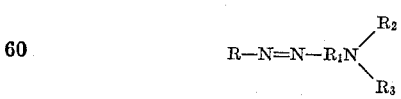

wherein R represents a benzene nucleus, $R_1$ represents a member selected from the group consisting of a benzene nucleus, and a naphthalene nucleus, $R_2$ represents a member selected from the group consisting of hydrogen, an alkyl group, a hydroxyalkyl group, an alkoxyalkyl group, a sulfoalkyl group, a sulfatoalkyl group, an acetoxyalkyl group, a cyclohexyl group, a phenyl group, and the group $R_3$, and $R_3$ represents an aliphatic chain of three or more carbon atoms, wherein two adjacent carbon atoms form part of a five membered cyclic acetal, and wherein the said adjacent carbon atoms are joined to the nitrogen atom through an alkylene group.

3. The azo compounds having the general formula:

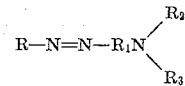

wherein R and $R_1$ each represent a benzene nucleus, $R_2$ represents a member selected from the group consisting of hydrogen, an alkyl group, a hydroxyalkyl group, an alkoxyalkyl group, a sulfoalkyl group, a sulfatoalkyl group, an acetoxyalkyl group, a cyclohexyl group, a phenyl group, and the group $R_3$, and $R_3$ represents an aliphatic chain of three or more carbon atoms, wherein two adjacent carbon atoms form part of a five membered cyclic acetal, and wherein the said adjacent carbon atoms are joined to the nitrogen atom through an alkylene group.

4. The azo compounds having the general formula:

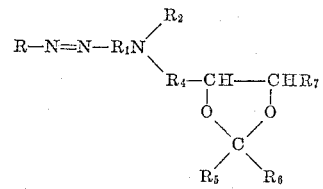

wherein R and $R_1$ each represent a member selected from the group consisting of a benzene nucleus, and a naphthalene nucleus, $R_2$ represents a member selected from the group consisting of hydrogen, an alkyl group, a hydroxyalkyl group, an alkoxyalkyl group, a sulfoalkyl group, a sulfatoalkyl group, an acetoxyalkyl group, a cyclohexyl group, a phenol group, and the group

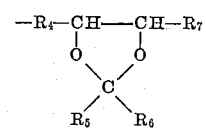

$R_4$ represents an alkylene group of one or more carbon atoms, $R_5$ represents a member selected from the group consisting of hydrogen, and an alkyl group, $R_6$ represents a member selected from the group consisting of hydrogen, an alkyl group, a hydroxyalkyl group, an alkoxyalkyl group, a sulfoalkyl group, and a tetrahydrofurfuryl group, and $R_7$ represents a member selected from the group consisting of hydrogen, an alkyl group, a hydroxyalkyl group, an alkoxyalkyl group, an acetoxyalkyl group, and a five-membered cyclic acetal group.

5. The azo compounds having the general formula:

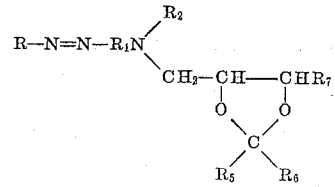

wherein R and $R_1$ each represent a member selected from the group consisting of a benzene nucleus, and a naphthalene nucleus, $R_2$ represents a member selected from the group consisting of hydrogen, an alkyl group, a hydroxyalkyl group, an alkoxyalkyl group, a sulfoalkyl group, a sulfatoalkyl group, an acetoxyalkyl group, a cyclohexyl group, a phenyl group, and the group

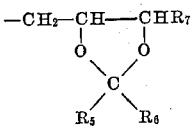

$R_5$ represents a member selected from the group consisting of hydrogen, and an alkyl group, $R_6$ represents a member selected from the group consisting of hydrogen, an alkyl group, a hydroxyalkyl group, an alkoxyalkyl group, a sulfoalkyl group, and a tetrahydrofurfuryl group, and $R_7$ represents a member selected from the group consisting of hydrogen, an alkyl group, a hydroxyalkyl group, an alkoxyalkyl group, an acetoxyalkyl group, and a five-membered cyclic acetal group.

6. The azo compounds having the general formula:

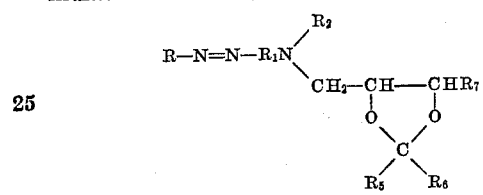

wherein R and $R_1$ each represent a benzene nucleus, $R_2$ represents a member selected from the group consisting of hydrogen, an alkyl group, a hydroxyalkyl group, an alkoxyalkyl group, a sulfoalkyl group, a sulfatoalkyl group, an acetoxyalkyl group, a cyclohexyl group, a phenyl group, and the group

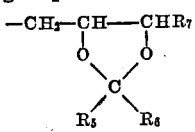

$R_5$ represents a member selected from the group consisting of hydrogen, and an alkyl group, $R_6$ represents a member selected from the group consisting of hydrogen, an alkyl group, a hydroxyalkyl group, an alkoxyalkyl group, a sulfoalkyl group, and a tetrahydrofurfuryl group, and $R_7$ represents a member selected from the group consisting of hydrogen, an alkyl group, a hydroxyalkyl group, an alkoxyalkyl group, an acetoxyalkyl group, and a five-membered cyclic acetal group.

7. Material made of or containing an organic derivative of cellulose colored with a dye selected from the class of azo compounds having the general formula:

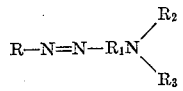

wherein R and $R_1$ each represent a member selected from the group consisting of a benzene nucleus, and a naphthalene nucleus, $R_2$ represents a member selected from the group consisting of hydrogen, an alkyl group, a hydroxyalkyl group, an alkoxyalkyl group, a sulfoalkyl group, a sulfatoalkyl group, an acetoxyalkyl group, a cyclohexyl group, a phenyl group, and the group $R_3$, and $R_3$ represents an aliphatic chain of three or more carbon atoms, wherein two adjacent carbon atoms form part of a five membered cyclic acetal, and wherein the said adjacent carbon atoms are joined to the nitrogen atom through an alkylene group.

8. Material made of or containing cellulose acetate colored with a dye selected from the class of azo compounds having the general formula:

$$R-N=N-R_1N\diagup^{R_2}_{R_3}$$

wherein R and $R_1$ each represent a member selected from the group consisting of a benzene nucleus, and a naphthalene nucleus, $R_2$ represents a member selected from the group consisting of hydrogen, an alkyl group, a hydroxyalkyl group, an alkoxyalkyl group, a sulfoalkyl group, a sulfatoalkyl group, an acetoxyalkyl group, a cyclohexyl group, a phenyl group, and the group $R_3$, and $R_3$ represents an aliphatic chain of 3 or more carbon atoms, wherein two adjacent carbon atoms form part of a five-membered cyclic acetal, and wherein the said adjacent carbon atoms are joined to the nitrogen atom through an alkylene group.

9. Material made of or containing cellulose acetate colored with a dye selected from the class of azo compounds having the general formula:

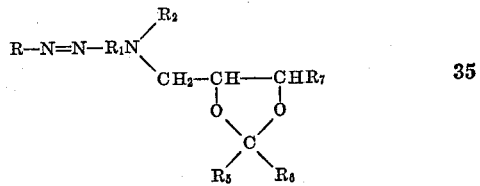

wherein R and $R_1$ each represent a member selected from the group consisting of a benzene nucleus, and a naphthalene nucleus, $R_2$ represents a member selected from the group consisting of hydrogen, an alkyl group, a hydroxyalkyl group, an alkoxyalkyl group, a sulfoalkyl group, a sulfatoalkyl group, an acetoxyalkyl group, a cyclohexyl group, a phenyl group, and the group

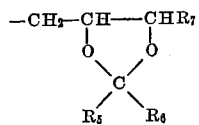

$R_5$ represents a member selected from the group consisting of hydrogen, and an alkyl group, $R_6$ represents a member selected from the group consisting of hydrogen, an alkyl group, a hydroxyalkyl group, an alkoxyalkyl group, a sulfoalkyl group, and a tetrahydrofurfuryl group, and $R_7$ represents a member selected from the group consisting of hydrogen, an alkyl group, a hydroxyalkyl group, an alkoxyalkyl group, an acetoxyalkyl group, and a five-membered cyclic acetal group.

JAMES G. McNALLY.
JOSEPH B. DICKEY.